United States Patent
Church et al.

(10) Patent No.: US 9,071,568 B2
(45) Date of Patent: *Jun. 30, 2015

(54) CUSTOMER-IDENTIFYING EMAIL ADDRESSES TO ENABLE A MEDIUM OF COMMUNICATION THAT SUPPORTS MANY SERVICE PROVIDERS

(71) Applicant: FORD GLOBAL TECHNOLOGIES, LLC, Dearborn, MI (US)

(72) Inventors: Zachary Church, Dearborn, MI (US); David Marvin Gersabeck, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/171,116

(22) Filed: Feb. 3, 2014

(65) Prior Publication Data

US 2014/0195627 A1      Jul. 10, 2014

Related U.S. Application Data

(63) Continuation of application No. 13/735,788, filed on Jan. 7, 2013, now Pat. No. 8,682,529.

(51) Int. Cl.

| | | |
|---|---|---|
| *G06F 7/00* | (2006.01) | |
| *H04L 12/58* | (2006.01) | |
| *G06Q 10/10* | (2012.01) | |

(Continued)

(52) U.S. Cl.

CPC .............. *H04L 51/38* (2013.01); *B60R 25/2081* (2013.01); *B60R 25/24* (2013.01); *G06F 2221/2111* (2013.01); *G06Q 10/107* (2013.01);

(Continued)

(58) Field of Classification Search

USPC .................................................. 701/36, 400

See application file for complete search history.

(56) References Cited

U.S. PATENT DOCUMENTS

| | | |
|---|---|---|
| 6,028,537 A | 2/2000 | Suman et al. |
| 6,278,772 B1 | 8/2001 | Bowater et al. |

(Continued)

FOREIGN PATENT DOCUMENTS

| | | |
|---|---|---|
| EP | 1969458 | 9/2008 |
| JP | 2007205872 | 8/2007 |

(Continued)

OTHER PUBLICATIONS

Search Report for German Applications 102011089349.0 (FMC 3324 PUS corresponding DE appln) dated Jan. 8, 2013, 7 pgs.

(Continued)

*Primary Examiner* — Hussein A. Elchanti

(74) *Attorney, Agent, or Firm* — Jennifer M. Stec; Brooks Kushman P.C.

(57) ABSTRACT

A system comprising one or more transceivers in communication with a vehicle computing system, the one or more transceivers are also in communication with at least one server. The at least one server is configured to receive an email including a subscriber identification and data formatted by a service provider. The at least one server is further configured to parse the email to retrieve the data formatted by the service provider and identify information usable by the vehicle computing system in the retrieved data. The at least one server is further configured to extract the identified information and transmit the information for communication to the vehicle computing system.

16 Claims, 5 Drawing Sheets

(51) Int. Cl.
*H04L 29/08* (2006.01)
*H04W 4/00* (2009.01)
*B60R 25/20* (2013.01)
*B60R 25/24* (2013.01)

(52) U.S. Cl.
CPC .............. *H04L 67/12* (2013.01); *H04L 51/046* (2013.01); *H04W 4/008* (2013.01)

(56) References Cited

U.S. PATENT DOCUMENTS

| | | | |
|---|---|---|---|
| 6,385,535 | B2 | 5/2002 | Ohishi et al. |
| 6,411,899 | B2 | 6/2002 | Dussell |
| 6,430,488 | B1 | 8/2002 | Goldman et al. |
| 6,459,969 | B1 | 10/2002 | Bates et al. |
| 6,505,780 | B1 | 1/2003 | Yassin et al. |
| 6,600,975 | B2 | 7/2003 | Moriguchi et al. |
| 6,629,033 | B2 | 9/2003 | Preston et al. |
| 6,728,349 | B2 | 4/2004 | Chang et al. |
| 6,845,251 | B2 | 1/2005 | Everhart et al. |
| 6,928,428 | B1 | 8/2005 | De Vries |
| 6,993,490 | B2 | 1/2006 | Chen et al. |
| 7,065,533 | B2 | 6/2006 | Arrouye et al. |
| 7,120,928 | B2 | 10/2006 | Sheth et al. |
| 7,127,259 | B2 | 10/2006 | Ueda et al. |
| 7,129,825 | B2 | 10/2006 | Weber |
| 7,139,722 | B2 | 11/2006 | Perrella et al. |
| 7,142,664 | B2 | 11/2006 | Seligmann |
| 7,143,058 | B2 | 11/2006 | Sugimoto et al. |
| 7,145,998 | B1 | 12/2006 | Holder et al. |
| 7,162,237 | B1 | 1/2007 | Silver et al. |
| 7,283,813 | B2 | 10/2007 | Hamanaga et al. |
| 7,340,691 | B2 | 3/2008 | Bassett et al. |
| 7,346,630 | B2 | 3/2008 | Eichstaedt |
| 7,370,079 | B2 | 5/2008 | Murata et al. |
| 7,376,226 | B2 | 5/2008 | Holder et al. |
| 7,433,714 | B2 | 10/2008 | Howard et al. |
| 7,444,384 | B2 | 10/2008 | Horvitz |
| 7,469,827 | B2 | 12/2008 | Katragadda et al. |
| 7,474,264 | B2 | 1/2009 | Bolduc et al. |
| 7,552,009 | B2 | 6/2009 | Nelson |
| 7,574,195 | B2 | 8/2009 | Krasner et al. |
| 7,586,956 | B1 | 9/2009 | Mishra et al. |
| 7,725,480 | B2 | 5/2010 | Bassett et al. |
| 7,747,246 | B2 | 6/2010 | Zellner et al. |
| 7,801,283 | B2 | 9/2010 | Harwood et al. |
| 7,813,950 | B2 | 10/2010 | Perrella et al. |
| 7,889,096 | B2 | 2/2011 | Breed |
| 7,917,285 | B2 | 3/2011 | Rothschild |
| 7,985,911 | B2 | 7/2011 | Oppenheimer |
| 8,112,720 | B2 | 2/2012 | Curtis |
| 8,126,889 | B2 | 2/2012 | Pitt |
| 8,223,975 | B2 | 7/2012 | Marko |
| 8,233,890 | B2 | 7/2012 | Zellner et al. |
| 8,316,046 | B2 | 11/2012 | Huang et al. |
| 2001/0037174 | A1 | 11/2001 | Dickerson |
| 2002/0068583 | A1 | 6/2002 | Murray |
| 2002/0107032 | A1 | 8/2002 | Agness et al. |
| 2002/0143879 | A1 | 10/2002 | Sommerer |
| 2003/0131023 | A1 | 7/2003 | Bassett et al. |
| 2003/0212480 | A1 | 11/2003 | Lutter et al. |
| 2004/0073643 | A1 | 4/2004 | Hayes et al. |
| 2004/0090121 | A1 | 5/2004 | Simonds et al. |
| 2004/0092253 | A1 | 5/2004 | Simonds et al. |
| 2004/0093154 | A1 | 5/2004 | Simonds et al. |
| 2004/0093155 | A1 | 5/2004 | Simonds et al. |
| 2004/0192270 | A1 | 9/2004 | Kreitzer |
| 2004/0215506 | A1* | 10/2004 | Mcewan et al. ................ 705/14 |
| 2004/0220768 | A1 | 11/2004 | Klein |
| 2004/0254715 | A1 | 12/2004 | Yamada |
| 2004/0268270 | A1 | 12/2004 | Hill et al. |
| 2005/0019228 | A1 | 1/2005 | Myers et al. |
| 2005/0088284 | A1 | 4/2005 | Zai et al. |
| 2005/0119030 | A1 | 6/2005 | Bauchot et al. |
| 2005/0149520 | A1 | 7/2005 | De Vries |
| 2005/0222933 | A1 | 10/2005 | Wesby |
| 2005/0289113 | A1* | 12/2005 | Bookstaff ........................ 707/1 |
| 2006/0058948 | A1 | 3/2006 | Blass et al. |
| 2006/0071804 | A1 | 4/2006 | Yoshioka |
| 2006/0165015 | A1 | 7/2006 | Melick et al. |
| 2006/0168627 | A1 | 7/2006 | Zeinstra et al. |
| 2006/0258377 | A1 | 11/2006 | Economos et al. |
| 2006/0290490 | A1 | 12/2006 | Kraus et al. |
| 2007/0004387 | A1 | 1/2007 | Gadamsetty et al. |
| 2007/0016362 | A1 | 1/2007 | Nelson |
| 2007/0042812 | A1 | 2/2007 | Basir |
| 2007/0043730 | A1* | 2/2007 | Wisely ............................ 707/10 |
| 2007/0044037 | A1 | 2/2007 | Amari et al. |
| 2007/0053513 | A1 | 3/2007 | Hoffberg |
| 2007/0061067 | A1 | 3/2007 | Zeinstra et al. |
| 2007/0120948 | A1 | 5/2007 | Fujioka et al. |
| 2007/0140187 | A1 | 6/2007 | Rokusek et al. |
| 2007/0233725 | A1 | 10/2007 | Michmerhuizen et al. |
| 2007/0238491 | A1 | 10/2007 | He |
| 2007/0264990 | A1 | 11/2007 | Droste et al. |
| 2007/0281603 | A1 | 12/2007 | Nath et al. |
| 2007/0285256 | A1 | 12/2007 | Batra |
| 2007/0294304 | A1 | 12/2007 | Bassett et al. |
| 2007/0299882 | A1 | 12/2007 | Padgett et al. |
| 2008/0005680 | A1 | 1/2008 | Greenlee |
| 2008/0057927 | A1 | 3/2008 | Han |
| 2008/0086455 | A1 | 4/2008 | Meisels et al. |
| 2008/0140488 | A1 | 6/2008 | Oral et al. |
| 2008/0143497 | A1 | 6/2008 | Wasson et al. |
| 2008/0150685 | A1 | 6/2008 | Desai et al. |
| 2008/0159503 | A1 | 7/2008 | Helbling et al. |
| 2008/0263069 | A1 | 10/2008 | Harris et al. |
| 2008/0281518 | A1 | 11/2008 | Dozier et al. |
| 2008/0294483 | A1 | 11/2008 | Williams |
| 2008/0294663 | A1 | 11/2008 | Heinley et al. |
| 2008/0319653 | A1 | 12/2008 | Moshfeghi |
| 2008/0319665 | A1 | 12/2008 | Berkobin et al. |
| 2009/0002145 | A1 | 1/2009 | Berry et al. |
| 2009/0005966 | A1 | 1/2009 | McGray et al. |
| 2009/0011799 | A1 | 1/2009 | Douthitt et al. |
| 2009/0056525 | A1 | 3/2009 | Oppenheimer |
| 2009/0074168 | A1 | 3/2009 | Henry |
| 2009/0075624 | A1 | 3/2009 | Cox et al. |
| 2009/0094088 | A1 | 4/2009 | Chen et al. |
| 2009/0111422 | A1 | 4/2009 | Bremer et al. |
| 2009/0112608 | A1 | 4/2009 | Abu-Hakima et al. |
| 2009/0144622 | A1 | 6/2009 | Evans et al. |
| 2009/0157299 | A1* | 6/2009 | Mafune ........................ 701/201 |
| 2009/0157615 | A1 | 6/2009 | Ross et al. |
| 2009/0157717 | A1 | 6/2009 | Palahnuk et al. |
| 2009/0158200 | A1 | 6/2009 | Palahnuk et al. |
| 2009/0193149 | A1 | 7/2009 | Khosravy |
| 2009/0248285 | A1 | 10/2009 | Bauer |
| 2009/0267757 | A1 | 10/2009 | Nguyen |
| 2009/0309742 | A1* | 12/2009 | Alexander et al. ............. 340/601 |
| 2009/0312901 | A1 | 12/2009 | Miller et al. |
| 2010/0017543 | A1 | 1/2010 | Preston et al. |
| 2010/0062714 | A1 | 3/2010 | Ozaki |
| 2010/0086112 | A1 | 4/2010 | Jiang et al. |
| 2010/0125801 | A1 | 5/2010 | Shin |
| 2010/0136944 | A1 | 6/2010 | Taylor et al. |
| 2010/0148920 | A1 | 6/2010 | Philmon et al. |
| 2010/0159964 | A1 | 6/2010 | Ferro |
| 2010/0169432 | A1 | 7/2010 | Santori, Jr. et al. |
| 2010/0210302 | A1 | 8/2010 | Santori et al. |
| 2010/0227629 | A1 | 9/2010 | Cook et al. |
| 2010/0228803 | A1 | 9/2010 | Quinn |
| 2010/0233957 | A1 | 9/2010 | Dobosz |
| 2010/0235891 | A1 | 9/2010 | Oglesbee et al. |
| 2010/0274689 | A1 | 10/2010 | Hammad et al. |
| 2010/0274865 | A1 | 10/2010 | Frazier et al. |
| 2010/0287024 | A1 | 11/2010 | Ward et al. |
| 2010/0323657 | A1 | 12/2010 | Barnard et al. |
| 2010/0330975 | A1 | 12/2010 | Basir |
| 2011/0021234 | A1 | 1/2011 | Tibbitts et al. |
| 2011/0039581 | A1 | 2/2011 | Cai et al. |
| 2011/0040707 | A1 | 2/2011 | Theisen et al. |
| 2011/0045810 | A1 | 2/2011 | Issa et al. |
| 2011/0072492 | A1 | 3/2011 | Mohler et al. |

(56) References Cited

U.S. PATENT DOCUMENTS

| | | |
|---|---|---|
| 2011/0087705 A1 | 4/2011 | Swink et al. |
| 2011/0121991 A1 | 5/2011 | Basir |
| 2011/0137520 A1 | 6/2011 | Rector et al. |
| 2011/0137773 A1 | 6/2011 | Davis, III et al. |
| 2011/0144980 A1 | 6/2011 | Rysenga |
| 2011/0176670 A1 | 7/2011 | Kaplan et al. |
| 2011/0257881 A1 | 10/2011 | Chen et al. |
| 2011/0289522 A1 | 11/2011 | Pontual et al. |
| 2011/0298924 A1 | 12/2011 | Miller et al. |
| 2011/0300843 A1 | 12/2011 | Miller et al. |
| 2011/0300884 A1 | 12/2011 | Ollila et al. |
| 2012/0010805 A1 | 1/2012 | Wilkerson |
| 2012/0041633 A1 | 2/2012 | Schunder et al. |
| 2012/0044089 A1 | 2/2012 | Yarnold et al. |
| 2012/0050028 A1 | 3/2012 | Mastronardi et al. |
| 2012/0054289 A1 * | 3/2012 | Aytulu et al. ............ 709/206 |
| 2012/0130953 A1 | 5/2012 | Hind et al. |
| 2012/0149441 A1 | 6/2012 | Saito et al. |
| 2012/0158658 A1 | 6/2012 | Wilkerson |
| 2012/0158918 A1 | 6/2012 | Leblanc et al. |
| 2012/0172009 A1 | 7/2012 | Wilkerson |
| 2012/0202525 A1 | 8/2012 | Pettini |
| 2012/0225677 A1 | 9/2012 | Forstall et al. |
| 2012/0271676 A1 | 10/2012 | Aravamudan et al. |
| 2012/0272176 A1 | 10/2012 | Nielsen et al. |
| 2012/0290289 A1 * | 11/2012 | Manera et al. ............ 704/9 |
| 2013/0024109 A1 | 1/2013 | Hosotani et al. |
| 2013/0124085 A1 | 5/2013 | Mochizuki et al. |
| 2014/0195345 A1 * | 7/2014 | Lyren .................... 705/14.53 |
| 2014/0207761 A1 * | 7/2014 | Brezina et al. ............ 707/722 |

FOREIGN PATENT DOCUMENTS

| | | |
|---|---|---|
| JP | 2008172820 | 7/2008 |
| WO | 03107129 | 12/2003 |
| WO | 2011016886 | 2/2011 |

OTHER PUBLICATIONS

Ford Motor Company, "SYNC," Owner's Guide Supplement, SYNC System Version 2 (Oct. 2008).

Christoph Hammerschmidt, MELEXIS, The Sky's The Limit, Continental NXP to integrate NFC into cars, Feb. 17, 2011, http://automotive-eetimes.com/en/continental-nxp-to-integrate-nfc-into-cars.html?cmp_id=.

Ford Motor Company, "SYNC with Navigation System," Owner's Guide Supplement, SYNC System Version 1 (Jul. 2007).

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 3 (Aug. 2009).

jNetX Call Reminder for BlackBerry. Feb. 17, 2009. Retrieved from: http://www.pocketberry.com/2009/02117/jneb-call-reminder-for-blackberry/.

Ford Motor Company, "SYNC with Navigation System," Owner's Guide Supplement, SYNC System Version 3 (Jul. 2009).

Kermit Whitfield, "A hitchhiker's guide to the telematics ecosystem", Automotive Design & Production, Oct. 2003, http://findarticles.com, pp. 1-3.

Blackberry, Blackberry Curve Series Blackberry Curve 9300/9330 Smartphones, User Guide Version 6.0, (2011). <www.blackberry.com/docs/smartphones>.

AppManiax, Inc. "PhonePlus Callback" (2009). <http://www.handango.com/catalog/ProductDetails.jsp?productId=254405&platformId=80>.

* cited by examiner

US 9,071,568 B2

CUSTOMER-IDENTIFYING EMAIL ADDRESSES TO ENABLE A MEDIUM OF COMMUNICATION THAT SUPPORTS MANY SERVICE PROVIDERS

CROSS-REFERENCE TO RELATED APPLICATIONS

This application is a continuation of U.S. application Ser. No. 13/735,788, filed Jan. 7, 2013, now pending, the disclosure of which is hereby incorporated in its entirety by reference herein.

TECHNICAL FIELD

The illustrative embodiments relate to a network for delivering a variety of services and providing a variety of features for a vehicle communication system connected to the network through a nomadic device or other device having wireless connection capability.

BACKGROUND

U.S. Pat. No. 7,917,285 generally discloses devices, systems and methods for remotely entering, storing and sharing location addresses for a positional information device, e.g., a global positioning system (GPS) device, are provided. The present disclosure allows a user to easily and safely enter an address into a GPS device by giving that address to a remote communications link and to have that link automatically program the user's GPS device for usage. The device, system and method of the present disclosure further allows the user to use this stored address(es) on multiple GPS devices without having to manually enter the address(es).

U.S. Pat. No. 7,370,079 generally discloses an e-mail sending and receiving system in which positional data about a plurality of places can be included in an e-mail message to be sent, and further detailed data can be obtained based on the included positional data, thereby improving the convenience and effectiveness of the positional data. The system includes a mail generating section for generating an e-mail message to be sent to an addressee; a positional data storage section for storing a plurality of positional data; and a positional data attaching section for attaching one or more of the positional data stored in the positional data storage section to the e-mail message generated by the mail generating section. The system may further include a section for generating detailed data relating to each positional data attached to the e-mail message, and attaching a URL for accessing the detailed data to the e-mail message.

U.S. Patent Application 2012/0044089 generally discloses a telematics server manages meeting request messages sent from, and to, a vehicle-coupled device. The server performs authentication services when a subscriber logs in to the server from the vehicle-coupled device, or with a device associated with the subscriber's telematics services account. Upon login, the server may append a session identifier to the request message. After the message passes through the server, an application running on a device remote from the vehicle receives the request message and accepts user input that permits the remote device to transmit its current location to the vehicle-coupled device in a confirmation message according to the session identifier. The telematics server can use the session identifier to determine the destination address of the vehicle-coupled device to forward the confirmation message to. The vehicle-coupled device displays the remote user device location on a map. The request and confirmation messages may include a media content file.

SUMMARY

A system comprising one or more transceivers in communication with a vehicle computing system, the one or more transceivers are also in communication with at least one server. The at least one server is configured to receive an email including a subscriber identification and data formatted by a service provider. The at least one server is further configured to parse the email to retrieve the data formatted by the service provider and identify information usable by the vehicle computing system in the retrieved data. The at least one server is further configured to extract the identified information and transmit the information for communication to the vehicle computing system.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
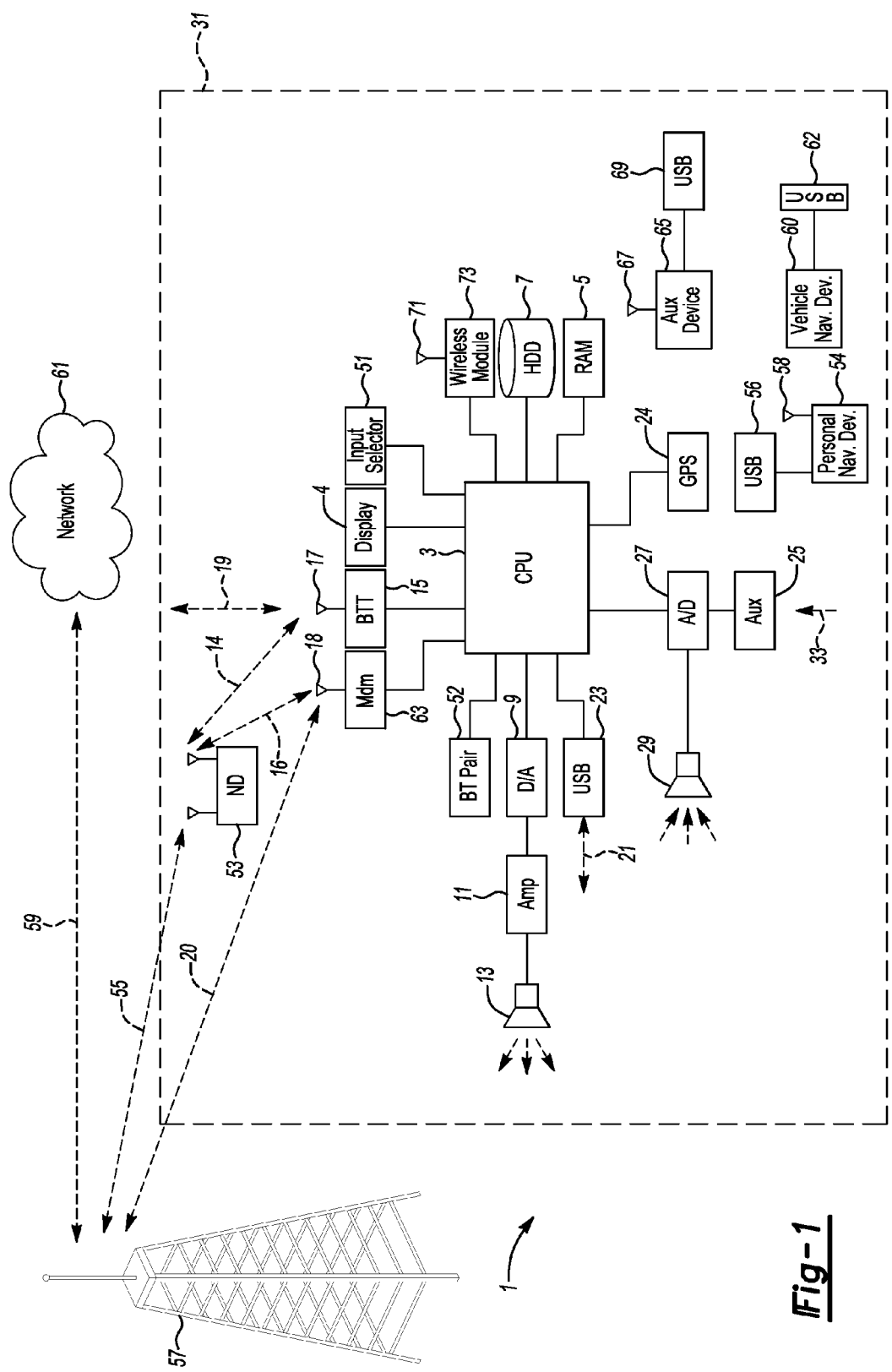
FIG. 1 is an exemplary block topology of a vehicle infotainment system implementing a user-interactive vehicle information display system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
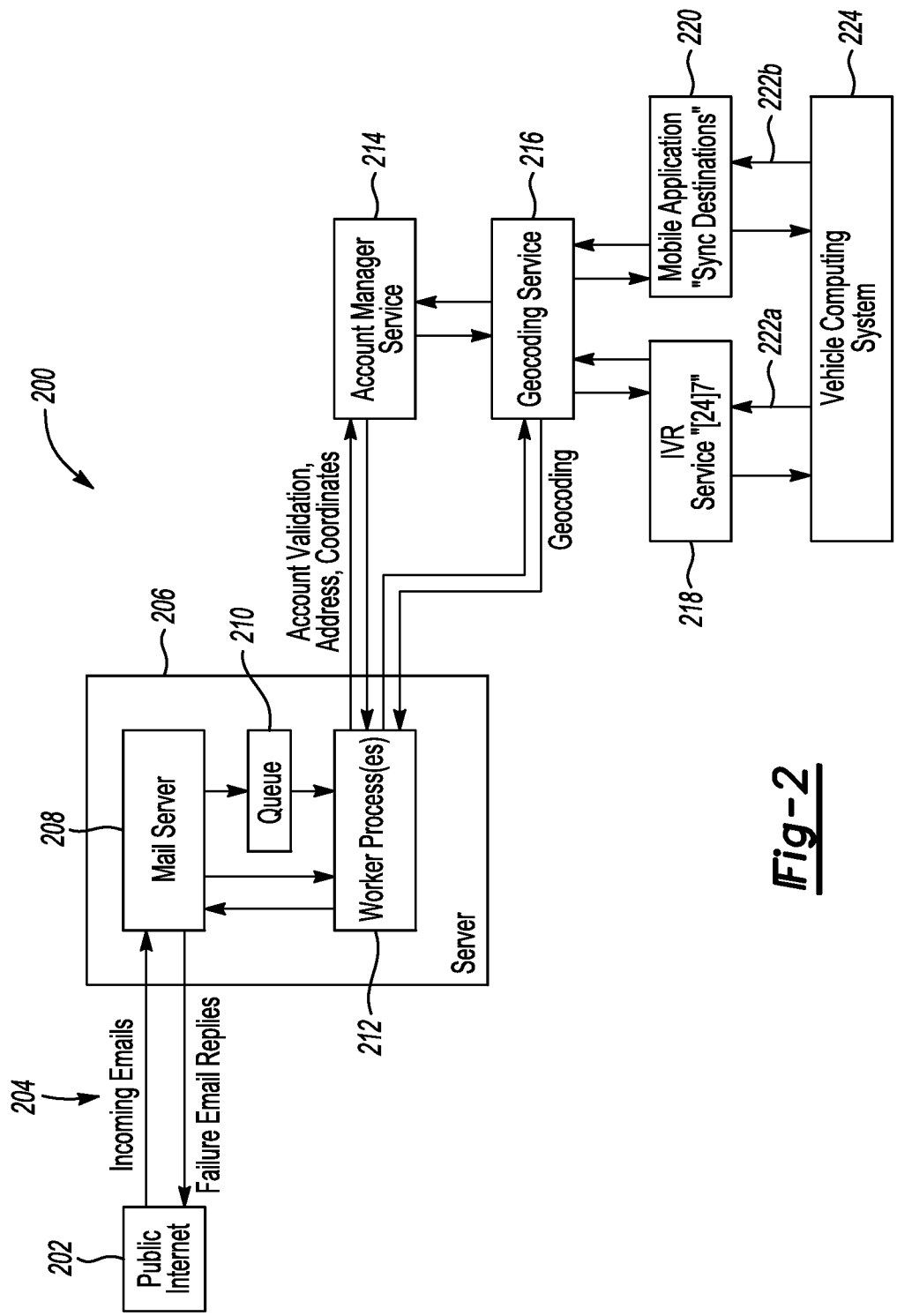
FIG. 2 is an exemplary block topology of a vehicle infotainment system receiving information from third party service providers.

FIG. 2 is an exemplary block topology of a vehicle infotainment system receiving information from third party service providers. Information from third party service providers may cooperate with vehicle infotainment systems with the use of custom interfaces developed with the service provider and the vehicle infotainment manufacturer. This custom development interface requires a significant investment of time and money. Service providers may allow sharing for various tasks and data via electronic mail messages. A solution to allow multiple service providers to share information without a custom interface is the development for a server medium of communication 200 that supports many service providers by accepting custom identifying electronic mail message addresses with embedded data that may be parsed and sent to a vehicle infotainment system.

The server medium of communication 200 may allow a service provider to transmit a task using an electronic mail message from the internet 202 to a server 206. The internet 202 may allow third party providers to transmit data including, but is not limited to, destination and routing information, traffic information, finding businesses, and other traffic, direction and information requested by a vehicle occupant. The third party provider transmits the data using an electronic mail message 204 to the server 206. The mail server 208 may receive the electronic mail message and transfer the message from one or more processors, databases or other operating systems in the server medium of communication.

Once received by the mail server 208, the electronic mail message may be sent to a request queue 210, or sent directly to be processed 212 by one or more processors and/or databases in communication with the server 206. The server may place an electronic mail message into a queue 210 based on a variety of system factors and limitations including the amount of information being requested and processed at the server during a given time in relation to the server's capabilities.

The electronic mail message may be transmitted to an account manager service 214 to validate the email request including, but is not limited to, verifying if the electronic mail message is from an active service subscriber. If the account manager service 214 verifies that the email is from an inactive service subscriber, it may notify the server of the inactive service subscriber. Once the server 206 receives notification of an inactive service subscriber, the server 206 may transmit a reply email message 204 to let the requester know that the service requested has been denied for lack of subscription.

Another example of the mail server 208 transmitting electronic messages to a requester of a service provider is to inform the requester that an error has been detected in the message received or if the server has identified an error.

After the account manager service 214 verifies the subscribers account, a message may be transmitted back to the server 206 to continue the processing of the data received from the electronic mail message. The server 206 may parse the data embedded in the electronic mail message. The parsing of the data may allow the server to retrieve and process information from multiple service providers that may present their data in different formats. After the parsing of data is complete, the server may communicate this information to a vehicle infotainment system.

The server may parse through and learn data types that are from service providers granting users to transmit information electronically embedded within an electronic mail message. An example of the server parsing information may include destination information from a service provider such as, but is not limited to, Google, Apple Maps and MapQuest. If destination data is embedded into an electronic mail message, the account manager service 214 may parse the destination data including, but is not limited to, address, coordinates, and other destination information. The parsed destination information may be sent to a geocoding service 216 in communication with the server 206 and/or the account manager service 214 to continue processing and validation of the destination.

The geocoding service 216 may confirm the destination information embedded in the electronic mail message by resolving the address to a valid global position latitude and longitude location. After confirming the actual address, the geocoding service 216 may then transfer the request to a wireless device, including, but is not limited to the mobile application 220 for wireless transmission to the infotainment system. The geocoding service may also include the retrieval of data collected in real-time, creating traffic speed information for major freeways, highways, and arterials. For example, the geocoding service may be supported by an INRIX Traffic system.

The geocoding service 216 may complete analysis of the destination information embedded in the electronic mail message and transmit the address information back to the server 206. Once the destination information is transmitted to the server's backend systems, it may be stored at an information storage system associated with the subscriber's identification. Once saved in the information storage system, a requester may connect with an Interactive Voice Response (IVR) 218 to check for whether the parsed destination information is present. A requester may connect with an IVR using a wireless nomadic devices including, but is not limited to, smart phones, personal computers, tablets, and/or other cellular devices. With the IVR, the requester may retrieve the destination information that originated from the electronic mail message from a service provider. If the requester confirms the destination information stored at the server 206, the destination and/or route may be downloaded with data-over-voice to the in-vehicle module.

The destination data from the server may be transferred wirelessly to the vehicle computing system 224 using a wireless nomadic device communicating with the IVR Service 218 and/or the Mobile Application 220. The wireless communication 222a and 222b between the nomadic device to the vehicle may be done by using Bluetooth technology. The vehicle may also be able to retrieve the destination data from the server through the IVR Service and/or mobile application by using an embedded cellular telephone integrated with the vehicle computing system.

Once the requester has downloaded the destination information, the requester may use the downloaded information with his driving experience. The downloaded destination information on the vehicle computing system 224 may be displayed in multiple ways to the occupants in a vehicle using the infotainment functions and features. For example, the destination information may be displayed on the touchscreen LCD display, and/or audibly over the vehicle speakers providing a driver with destination directions. The mail server 208 may transmit an electronic message to a requester of a service provider to inform the requester that the server successful parsed and/or transmitted the destination data to the vehicle computing system.

Figure 3:
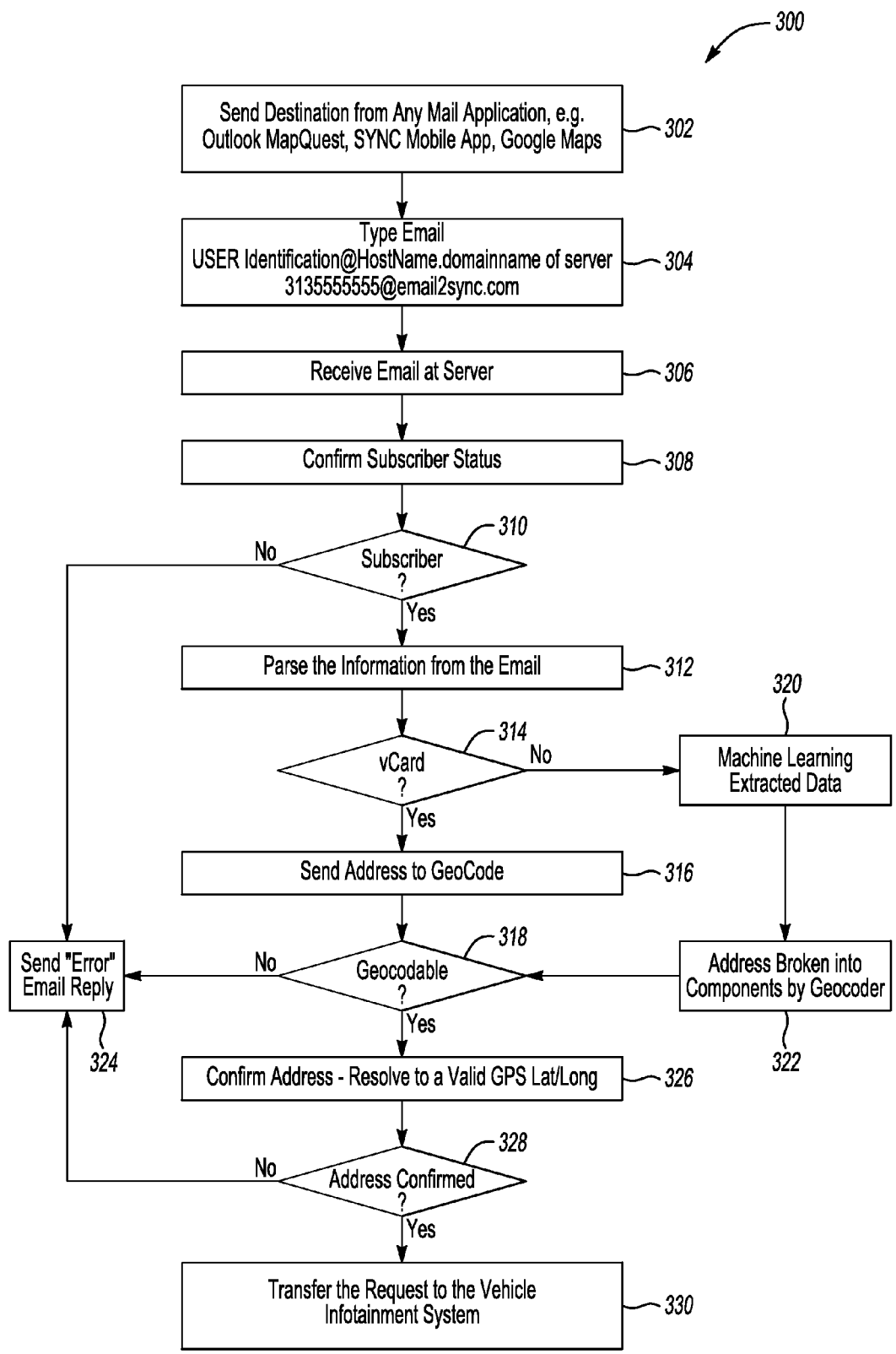
FIG. 3 is a flow chart illustrative of a vehicle infotainment system in communication with a server that is able to receive and process navigation information from third party service providers.

FIG. 3 is a flow chart illustrative of a vehicle infotainment system in communication with a server that is able to receive and process navigation information from third party service providers. Vehicle infotainment systems in communication with a server may perform functions including, but is not limited to, parsing, analyzing, processing, and transmitting data while eliminating the use of custom interfaces that are usually developed specifically for each service provider. The information provider may transmits embedded data within an electronic mail message to a server allowing the system to parse through the data before being communicated to a subscriber's infotainment system. A vehicle infotainments system 300 that includes communication with a server that parses embedded data from a service provider's electronic message may allow data to be communicated to a requester without the use of a custom interface application.

At step 302, a service provider (e.g. MapQuest, Apple Map, Google) may send information and tasks from any electronic mail message application. The service provider information and tasks may include, but is not limited to, destination data. The electronic mail message application may include, but is not limited to, Gmail, Microsoft Outlook, Yahoo Mail, and/or Hotmail. A user may obtain information, including destination data, from a service provider and attach the information to an electronic mail message.

At step 304, a requester may address the electronic mail message with a unique user identification that is associated with the requester at the server. The unique user identification may be used to determine if a requester is an active user at the server. The unique user identification may also allow the server once the information and tasks is processed, to store the data based on the user identification. An example of the unique user identification within the electronic mail message may include, but is not limited to, the following format: user_identification@HostName.DomainName. The user_identification may include a requester's unique user identification including, but is not limited to a requester's cellular telephone number.

At step 306, once the properly addressed user identification electronic mail message embedded with service provider data is sent, the message may be received by the server. Before parsing through the electronic mail message embedded information, the server may verify if the requester is an active subscriber at step 308. If the server detects that the requester is not a valid subscriber it may generate a reply electronic message notifying the user that the request has been denied due to lack of subscription at step 324.

At step 312, the server may begin to parse the information embedded within the electronic message once the requester has been verified as an active subscriber. The server may communicate with other systems to parse a string of text that a requester embedded within the electronic mail message. At step 314, the system performing the parsing of the embedded information and/or task may check for certain formats that the system can parse through and/or learn to parse through. An example of a data format that the system may parse through to obtain a service provider's information and/or tasks may be a versitcard (vCard) format of data. The vCard attachment in the electronic mail message allows any customer or service provider to provide information to a particular subscriber's account. This may avoid having to develop a custom interface for each provider or user to communicate information and/or task offered by the service providers.

At step 314, if the embedded information is in the vCard format, the system may recognize the data in that format allowing the system to parse the information. For example, if the embedded information attached to the electronic mail message is destination data in a vCard format, the system may parse the destination data determining the address, street name, city and state in order to deliver that to the geocode service at step 316.

At step 320, if the embedded information is not in an unknown format, the system may use a machine learning algorithm to intelligently extract the information of concern. Machine learning allows the system to learn how to recognize and extract data from a non-standardized format. For example, if the embedded information attached to the electronic mail message is destination data in a unknown format, the system may look at a string of text that a user may have typed in an email, or copied from a service provider, and from that string of text try to determine the house number, street name, city and state in order to deliver that to the geocode service at step 322.

At step 318, the system may determine if the extracted data from the embedded info in the electronic mail message is geocodable, allowing for confirmation with valid GPS latitude and longitude coordinates. If the extracted data from the embedded information in the electronic mail message is not geocodable, preventing confirmation with valid GPS latitude and longitude coordinates, a message may be sent to the requester to notify of the error at step 324.

At step 326, the geocodable destination data extracted from the electronic mail message may be sent to a geocoding service allowing for confirmation of the address while validating a GPS latitude and longitude coordinates. The system may determine if the address extracted from the electronic mail message is confirmed by the GPS latitude and longitude coordinates at step 328. If the destination data extracted from the electronic mail message is not confirmed by the system as a valid address, the system may send a message to the requester notifying of the error at step 324.

At step 330, the requested information is ready to be transferred to the requester's infotainment system after the address has been confirmed with a valid GPS latitude and longitude coordinates. The requester may access the server, at which time there is a check for whether extracted data is present. If there is extracted data stored on the server, the requester may confirm a transmittal of the data to upload at the VCS. Once received at the VCS, the data may be presented in several systems communicating with the VCS including, but is not limited to, a LCD touchscreen display, audibly communicated over the vehicle speakers, or on the instrument panel LCD.

A vehicle infotainments system 300 may transmit an electronic message to a requester of a service provider to inform the requester that the server successfully parsed and/or transmitted the destination data to the vehicle computing system. If the server detects that the request was successfully transmitted, it may generate a reply electronic message notifying the user that the request is complete and awaiting implementation at the vehicle computing system.

Figure 4:
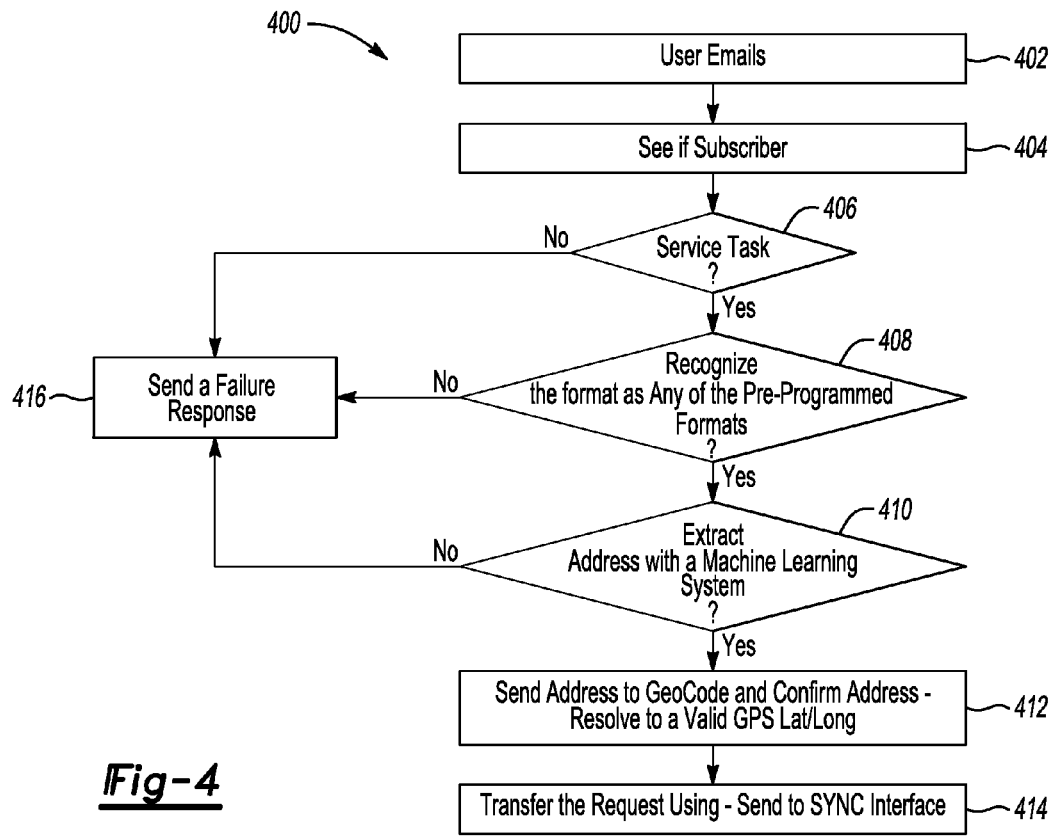
FIG. 4 is a flow chart illustrative method extracting data from a third party provider of navigation information via electronic mail message.

FIG. 4 is a flow chart illustrative method extracting data from a third party provider of navigation information via electronic mail message. A user may request navigation data from many service providers including, but is not limited to, Google Maps, MapQuest, and Apple Maps. The following flow chart 400 is an example that illustrates the use of emails embedded with data from a service provider to communicate information though a requester's vehicle infotainment systems without a custom application interface.

At step 402, the user may submit an electronic mail message embedded with a service provider's task and/or information. A server that communicates with other systems may receive the email and before parsing through the electronic message's embedded data, it may verify if the user is an active subscriber at step 404. If the server verifies the user as an active subscriber, the server may continue to process the request by the user. The server in communication with other systems may determine if the requested service task is supported by the system at step 406. If the server discovers that the service task is not supported by the system, a message may be generated to respond to the user that their request has been denied at step 416.

At step 408, the server in communication with a system to parse information from the electronic message may determine if the embedded message is a recognized format as any of the pre-programmed formats (e.g. vCard). If the system is unable to recognize the embedded message format preventing the parsing of data, a message may be generated to respond to the user that their request has been denied due to an error at step 416.

At step 410, if the embedded information is in an unknown format, the system may use machine learning to intelligently extract the information from the embedded data in the electronic message. Machine learning allows the system to extract data from a non-standardized format. For example, if the embedded information attached to the electronic mail message is destination data in a unknown format, the system may look at a string of text that a user may have typed in an email and from that string of text try to determine the house number, street name, city and state in order to deliver that to the geocode service. Machine learning systems may be created by first developing models using linguistic grammar-based techniques while including statistical models. Once the model has been developed, unannotated user emails are run through the model to get its predictions for name and addresses. If the system is unable to recognize the embedded message while parsing the data, a message may be generated to respond to the user that their request has been denied due to an error at step 416.

At step 412, the system may determine if the extracted data from the electronic mail message embedded information is geocodable to allow for confirming a valid GPS latitude and longitude coordinates. The geocodable destination data extracted from the electronic mail message may be sent to a geocoding service allowing for confirmation of the address while validating a GPS latitude and longitude coordinates. The system may determine if the address extracted from the electronic mail message is confirmed by the GPS latitude and longitude coordinates.

At step 414, the requested information and/or tasks is ready to be transferred to the requester's infotainment system after the address has been confirmed with a valid GPS latitude and longitude coordinates. The server may send a message to the requester to notify that the information requested is ready for downloading. The requester may also access the server, at which time there is a check for whether extracted data is present. If there is extracted data stored on the server, the requester may confirm a transmittal of the data to the VCS. Once received at the VCS, the data may be presented in several systems communicating with the VCS including, but is not limited to the touchscreen display, over the audible speakers, or on the instrument panel LCD. The system may generate a reply message to respond to the user that their request has been successfully parsed and/or downloaded at the VCS.

Figure 5:
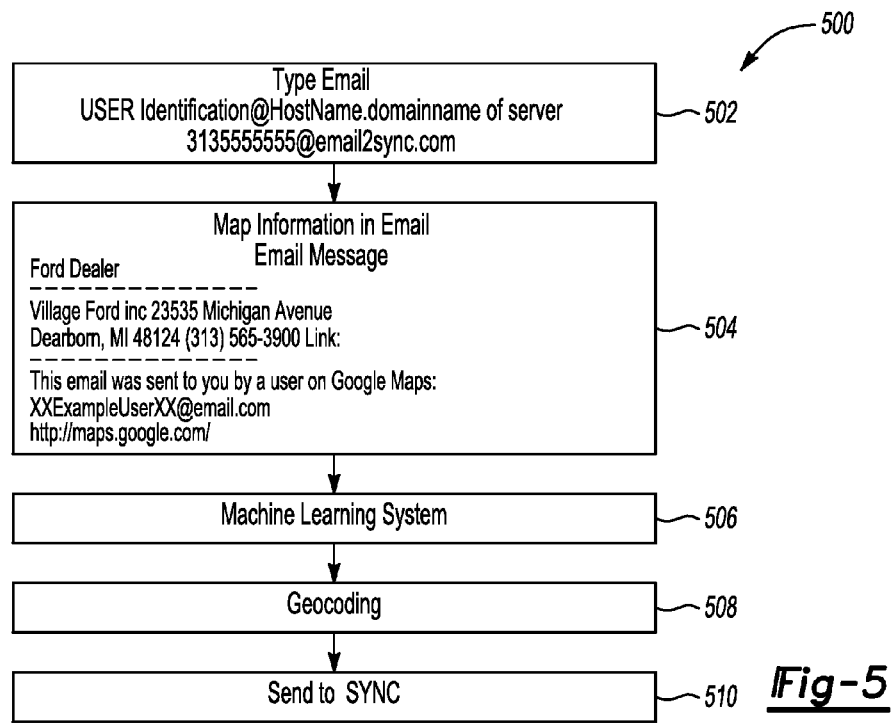
FIG. 5 is a flow chart illustrative method of a machine learning system.

FIG. 5 is a flow chart illustrative method of a machine learning system. The machine learning system, integrated with a server, may analyze a collection of training data to make generalizations about the entities the system may want to extract, and uses these generalizations to extract these entities from data embedded electronic messages. The following deconstructing method 500 is an example that illustrates the use of emails embedded with data from a service provider and parsing this information with the use of a machine learning system.

At 502, a requester may address the electronic mail message with a unique user identification that is associated with the requester at the server. The unique user identification may be used to determine if a requester is an active user at the server. The unique user identification may also allow the server to store the data based on the user identification once the information and tasks are processed. An example of the unique user identification within the electronic mail message may include, but is not limited to, the following format: user_identification@HostName.DomainName. The user_identification may include a requester's unique user identification including, but not limited to a requester's telephone number. The user_identification may also be assigned by the infotainment manufacturer by associating the user ID with the user's vehicle identification number. The HostName.DomainName may be assigned by the server.

At 504, a requester may transmit information from a service provider by electronic message. The service provider format may be unknown by the system and based on a string of text with multiple alphabetic and numeric symbols in a non-standardized format. The electronic message may be used to train the machine learning system to understand how to parse the embedded information. A collection of algorithms may be developed for storing text, annotating text, and learning to extract entities and categorize text. An example of the embedded information may include information sent from Google Maps. The information sent from Google Maps may include, but is not limited to, the following text: Village Ford Inc 23535 Michigan Avenue Dearborn, Mich. 48124 (313) 565-3900 and a link from the service that provided the information. The system may learn to parse through the data to get the desired information that the requester has sought from the Google Maps site.

The machine learning system may be able to parse the name of the desired location, street, city, state, zip code and telephone number. An example of the parsing done by the machine learning system is the extraction and categorization of the data: <name>Village Ford Inc</name> <street>23535 Michigan Avenue</street> <city>Dearborn</city>, <state/MI</state> <zip>48124</zip> (313) 565-3900 and a Link.

At 506, the embedded information in a non-standardized format may use machine learning to intelligently extract the information of concern. Machine learning may allow the system to extract data from a unknown format. For example, if the embedded information attached to the electronic mail message is destination data in a non-standardized format, the system may look at a string of text that a user may have typed in an email and from that string of text try to determine the house number, street name, city and state in order to deliver that to the geocode service.

At 508, the system may determine if the extracted data from the electronic mail message embedded information is geocodable to allow for confirming a valid GPS latitude and longitude coordinates. The geocodable destination data extracted from the electronic mail message may be sent to a geocoding service allowing for confirmation of the address while validating a GPS latitude and longitude coordinates. The system may determine if the address extracted from the electronic mail message is confirmed by the GPS latitude and longitude coordinates.

At 510, the requested information and/or tasks are ready to be transferred to the requester's infotainment system after the address has been confirmed with a valid GPS latitude and longitude coordinates. The requester may access the server, at which time there is a check based on the user identification for whether extracted data is present. If there is extracted data stored on the server, the requester may confirm a transmittal of the data to the VCS. Once received at the VCS, the data may be presented in several systems communicating with the VCS including, but is not limited to the touchscreen display, audible over speakers, or on the instrument panel LCD.

Figure 6:
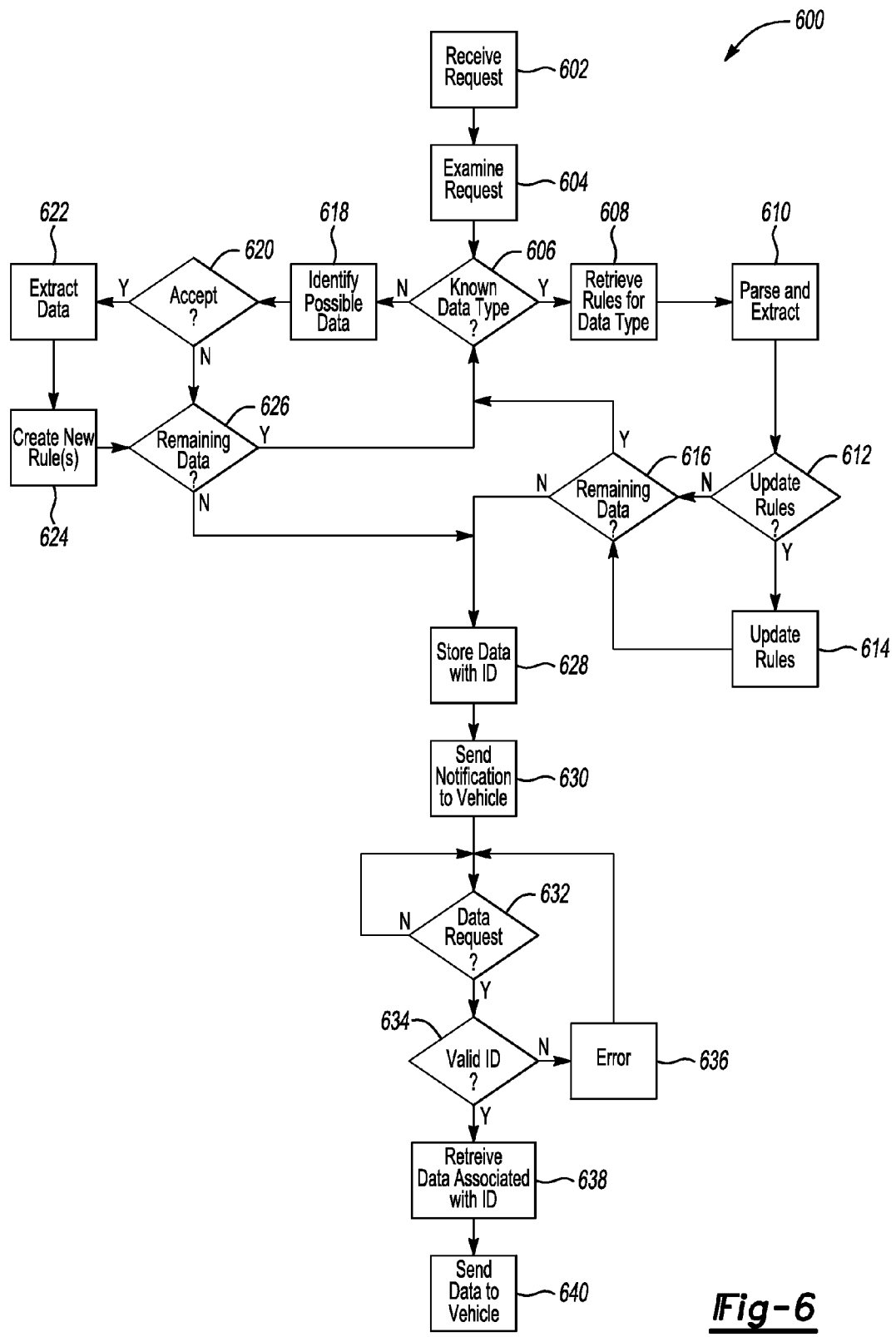
FIG. 6 is a flow chart illustrative method of parsing and learning how to parse data from an electronic mail message.

FIG. 6 is a flow chart of an illustrative method of parsing and learning how to parse data from an electronic mail message. The system may be able to parse the data, or learn how to parse data to discover a nonstandard or unfamiliar data type. The following learning method 600 performed by the system is an example that illustrates how the system may develop rules to parse data from known and unknown data types. For example, developing a trained model to get its predictions for names and addresses from a block of text may use one or more named entity recognition systems.

At step 602, the system may receive a request from a user containing embedded data from a service provider. The request may include user information, including, but not limited to, user identification, allowing the system to verify user subscription based off the identification etc. Once the request is received, the system may examine the data from the service provider at step 604. The system may determine if an embedded data type is known based on the examination at step 606. An example of a data type that is known may be vCard formatted data. An example of unknown data may be a block of text received by the system in a format not recognized by the system. Additionally or alternatively, while the text itself may be recognizable, it may contain an example of data that is not yet categorized. For example, the text may contain both a business name and an address. Such an example is below:

"Mark, Let's meet at Rosco's Bar. The address is 201 E. Smith St. Martainsville, La., 33030."

In such an example, the system may "realize" that the example contains a name "Rosco's Bar" and an address "201 E. Smith St., Martainsville, La., 33030." The system may be unsure, however, if this is an element to be retrieved. Handling of such data will be discussed in greater detail with respect to element 620.

At step 608, the system may be able to retrieve the appropriate rules for the parsing process if the data type is known. The rules may be a set of conditions or standards which have been developed to allow the system to manipulate the data appropriately. For a known data type, including vCard, rules include field parameters and values used for different purposes by the vCard format to indicate certain information. An example of vCard rules are the self-delimited format of information by beginning each dataset with BEGIN:vCard, and ending with END:vCard. Applying the rules for a known data type, the system may begin to parse and extract the data at step 610. While parsing the data the system may be able to update the data type rules for the known format at step 612. Once the system has determined if the rules for the known data type need updating, the system may go and retrieve the updated rules before continuing the parsing process at step 614.

At step 616, the system may continue to parse and extract the remaining data. The remaining data may be analyzed in an orderly way by dividing words and phrases into different parts in order to understand relationship and meaning. The system may decide if the continued data is a known data and continue the parsing and extracting loop of the known data type at step 606. If there is remaining data that is in an unknown data type format, the system may attempt to identify the possible data type at step 618.

At step 620, the system may be able to identify possible data based on the systems capability to train a model for named entity recognition. The system may be able to learn the unknown data type, therefore accepting to extract and parse the data at step 620. The system may contain a codebase with a collection of data types to train a model for named entity recognition. The system may run the unknown data type through the trained model to get its predictions for classifying elements in text into predefined categories including, but is not limited to, names, categories, addresses, and other destination data at step 622.

For example, in the Rosco's Bar example given above, the system may recognize a state designation "LA." Very few instances of double capital letters are used to designate anything other than a state, so the system could assume that this corresponds to a state. A check against known state designations could verify that LA can be used to refer to Louisiana. At the same time, knowing that a potential state is present, the system could examine the characters surrounding the state designation to determine that a possible address is present. The user could then be asked if retrieval/storage/use of the new data type, Inline_Address (an exemplary data type name) should be implemented.

At 624, the system may learn the best approach while creating new rules during the extraction of the data type. The new rules may include adjustment of internal parameters of the system to optimize performance of the parsing. The system may determine if there is remaining data to parse at step 626. The system may decide if the continued data is a known data and continue the parsing and extracting loop of the unknown data type at step 606.

At step 628, once the data has been parsed and extracted, the system may store the data based on the associated user identification. The parsed and extracted data may be stored until the system receives a request from the user. The system may detect that the user has entered their vehicle, and based on the detection transmit a notification to the user that the parsed and extracted data is ready to download at step 630. The user may accept the notification, and request the parsed data from the system at step 632. If the user declines the notification, the system may send an additional notification at a later time.

At step 634, the system may receive the data request and determine if the user requesting the data is valid. For example, the system may receive a notification that the parsed data is ready for download, if the user is not an authorized user, the system may send an error message notifying that an unauthorized user cannot download the data at step 636. If the user requesting the data for download is a valid requester, the system may retrieve the stored data associated with the user identification at step 638.

At step 640, once the system has retrieved the data associated with the user identification, the system may prepare to transmit the data to the vehicle. The transmission of data to the vehicle may occur in several ways, including, but is not limited to, the vehicle computing system communicating with a wireless device, or a remote computing system connected through the wireless device for communication to the system. The wireless device may include, but is not limited to, an embedded cellular modem, embedded WiFi device, Bluetooth transmitter, Near Field Communication connected to phone, brought-in cellular device like a USB modem, MiFi, smartphone that may be connected to the vehicle through SYNC or other Bluetooth pairing device, or a PC that may be connected to the vehicle through SYNC or other Bluetooth pairing device.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
 a transceiver in communication with a vehicle computing system (VCS);
 a server in communication with the transceiver, the server is configured to:
  receive an email including a subscriber identification and data formatted by a service provider;
  parse the email to retrieve the data formatted by the service provider;
  identify information usable by the VCS in the retrieved data;
  extract the identified information; and
  transmit the information for communication to the VCS.

2. The system of claim 1, wherein the information includes at least one of a name, address, and phone number based on the list of businesses.

3. The system of claim 2, wherein the VCS includes one or more applications to process the at least one of the name, address, and phone number of the list of businesses.

4. The system of claim 3, wherein the one or more applications may output destination information based on the list of businesses.

5. The system of claim 1, wherein the transceiver is based on wireless technology including at least one of Wi-Fi, Mi-Fi, Bluetooth, and Bluetooth low energy.

6. The system of claim 1, wherein the server is further configured to provide the information to at least one of a nomadic wireless device and an embedded cellular telephone based on the subscriber identification.

7. The system of claim 1, wherein the subscriber identification is a cellular telephone number.

8. A method comprising:
 receiving an email including a subscriber identification and data formatted by a service provider;
 parsing the email to retrieve the data formatted by the service provider;
 identifying, via a server having at least one processor, information usable by a vehicle computing system in the retrieved data;
 extracting the identified information; and
 transmitting the information for communication to the vehicle computing system based on the subscriber identification.

9. The method of claim 8, further comprising transmitting the information to at least one of a nomadic wireless device and an embedded cellular phone.

10. The method of claim 8 wherein the transmitting of the information is done by wireless technology including at least one of WiFi, Bluetooth, and Mi-Fi.

11. The method of claim 8, wherein the information includes at least one of a name, address, and phone number based on the list of businesses.

12. The method of claim 11, wherein the vehicle computing system includes one or more applications to process the at least one of the name, address, and phone number of the list of businesses.

13. The method of claim 12, wherein the one or more applications may output destination information based on the list of businesses.

14. The method of claim 13 wherein the vehicle computing system communicating the destination information on an LCD touchscreen.

15. A computer-program product embodied in a non-transitory computer read-able medium that is programmed for transmitting extracted service provider data to a vehicle computing system for processing using one or more applications, the computer-program product comprising instructions for:
 receiving an email including a subscriber identification and data formatted by a service provider;
 parsing the email to retrieve the data formatted by the service provider;
 identifying information usable by the vehicle computing system in the retrieved data;
 extracting the identified information; and
 transmitting the information for communication to the vehicle computing system based on the subscriber identification.

16. The computer-program product of claim 15, further comprising additional instructions for processing the received information at the vehicle computing system based on the one or more applications and outputting the processed information to a display.

* * * * *